United States Patent [19]

Schreitmüller

[11] 4,078,306
[45] Mar. 14, 1978

[54] HAND GRASS SHEARS OPERATED BY AN ELECTRIC MOTOR

[75] Inventor: Hans-Jörg Schreitmüller, Betzdorf, Germany

[73] Assignee: Wolf-Gerate GmbH, Germany

[21] Appl. No.: 774,699

[22] Filed: Mar. 4, 1977

[30] Foreign Application Priority Data

Mar. 9, 1976 Germany .............................. 2609735

[51] Int. Cl.² .............................................. B26B 19/12
[52] U.S. Cl. ................................... 30/204; 30/DIG. 1
[58] Field of Search ................. 30/204, 237, 238, 239, 30/DIG. 1, 272

[56] References Cited

U.S. PATENT DOCUMENTS

| 421,024 | 2/1890 | Bechtol | 30/204 |
| 3,623,223 | 11/1971 | Edgell | 30/DIG. 1 |

Primary Examiner—Jimmy C. Peters
Attorney, Agent, or Firm—Ostrolenk, Faber, Gerb & Soffen

[57] ABSTRACT

Grass shears with one movable blade, including a crank link means for imparting simultaneous lateral and longitudinal motion to the movable blade.

15 Claims, 5 Drawing Figures

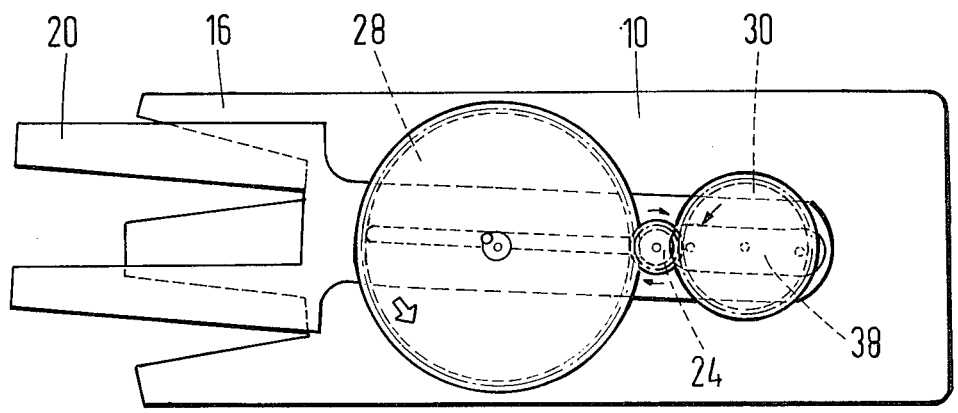
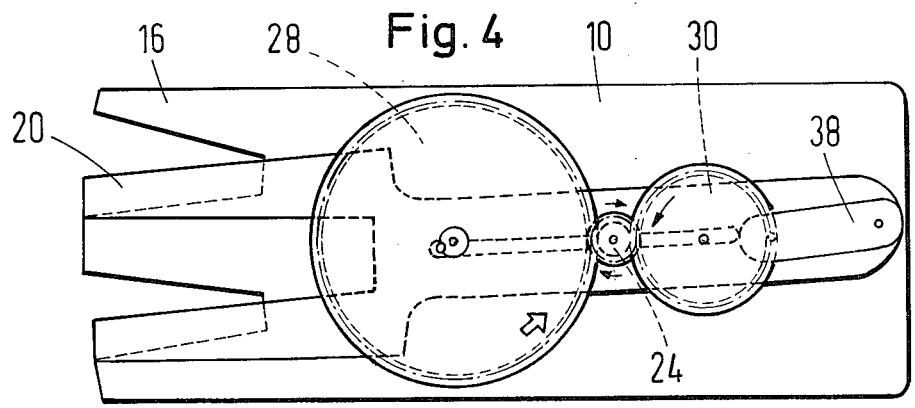
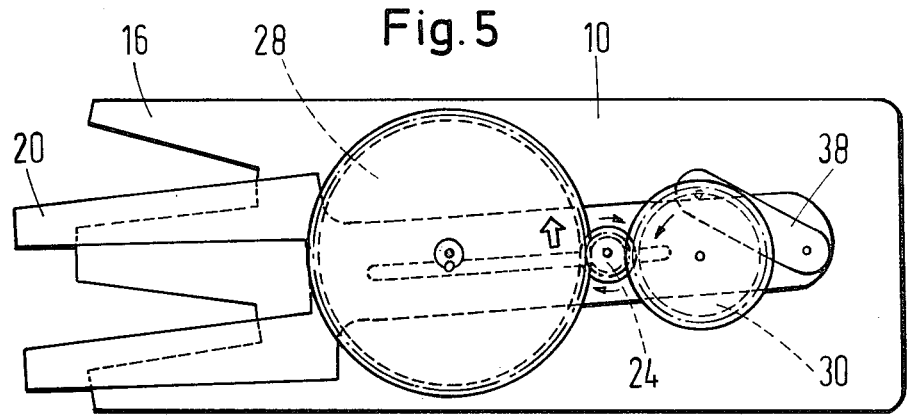

HAND GRASS SHEARS OPERATED BY AN ELECTRIC MOTOR

The invention relates to hand grass shears operated by an electric motor comprising a fixed lower blade and an upper blade which is movable relatively thereto and which is driven by the drive shaft of the motor fed by a battery via a transmission which has an eccentric drive for producing the lateral oscillatory movement.

Such power shears with or without handle have found increasing use recently because they represent a considerable facilitation of work compared with conventional hand shears when cutting lawn edges and the like. In the known lawn shears the movable upper blade is connected to the fixed lower blade via a pivot pin so that the blade edges or combs are moved on a circular arc about the axis of rotation relatively to each other. The limited pivotal movement of the upper blade is effected by an eccentric which is mounted on a gear driven via a reduction transmission and engages in a corresponding slot recess of the movable upper blade. With skilful guiding and slow advancing such lawn shears even permit cutting of dense grass tufts or tangled lawn areas but when the advancing motion is too rapid the blades may jam if the shearing action is no longer adequate for the cutting. Although in such shears the motor is designed so that the increased current flow in the stationary state does not damage the windings, in many cases difficulty is involved in extracting the shears blocked in this manner again from the material clamped between the shearing combs but not severed.

In addition, a jamming of the blades leads to a behaviour of the electrical drive system similar to a short-circuiting. High short-circuiting currents occur which are about 6 to 8 times the normal operating current and lead to rapid discharging of the batteries, possibly causing damage. Because of the limited battery power this phenomenon is highly undesirable because it greatly restricts the time of use of the units per battery charging.

In addition, it is desirable to increase the time of use by improving the efficiency of the mechanical cutting system and as economic solution compared with increasing the battery power so that the user can reliably carry out and terminate the lawn cutting work intended per battery charging without intermediate charging.

The problem underlying the invention is thus to improve such motor-driven hand grass shears so that the danger of jamming is reduced and the cutting power improved.

According to the invention, this problem is solved in hand grass shears of the type mentioned at the beginning in that in the transmission chain between the motor output shaft and upper blade links are inserted which impart to the upper blade an additional longitudinal movement. This provides a pulling cut of the blades, i.e. the blades are not only guided on a circular arc with respect to each other but the cutting edges also execute a longitudinal movement in the direction of their cutting edge relatively to each other, providing in addition to the shearing action a cutting effect so that the cutting is improved for the same motor drive power. This even makes it possible to cut hedges with relatively thin sprigs with such hand shears. Thick and tangled lawns can also be cut in improved manner with a greater range of travel and less danger of jamming.

Admittedly, it is known in manually operated garden shears to make the blades operate with a pulling cut (cf. for example DT-AS No. 1,063,848, U.S. Pat. No. 2,528,816, U.S. Pat. No. 2,954,605 and DT-PS No. 15 82 913). These garden shears are in some cases also suitable for cutting lawn edges. DT-PS 2,213,090 also discloses a mowing machine comprising a mowing beam extending transversely of the travelling direction, the blades of which are set in oscillatory and pulling motion by a drive shaft extending parallel to the mowing beam so that the blade combs used also produce a pulling cut.

In motor-driven hand grass shears, so far the use of the "pulling cut" known per se is not known. This is no doubt due to the fact that the transmission arrangements employed in hand shears cannot be readily applied to motor-driven hand shears because in the latter the drive is via a rotating shaft which rotates at a relatively high speed whereas in the case of manually operated shears the motions originating from the grip handles are converted by suitable guide means relatively simply to a pulling cut. The large and complex transmission arrangement in the known mowing machine could moreover not be taken as a basis for motor-driven hand grass shears.

The invention is further based on the problem of obtaining this pulling cut using a simple transmission which can be accommodated compactly in the shears housing without having to increase the dimensions of said housing compared with the dimensions of conventional motor-operated grass shears.

This problem is solved according to an expedient further development of the invention in that a pinion mounted on the motor shaft extending perpendicularly to the cutting plane drives two gears mounted with their axes fixed with respect to the housing, one of which produces the lateral shearing movement via an eccentric drive and the other of which produces the longitudinal movement via a crank joint. All the gears are conveniently located with their axes on the longitudinal centre plane of the shears so that they occupy less space vertically than the reduction gears hitherto employed in such grass shears, which were usually located in a plurality of planes. This is made possible by keeping the drive pinion disposed between the two transmission gears small in diameter thus obtaining the necessary reduction.

The upper blade preferably comprises a central slot into which an eccentric pin connected to the front gear engages and the crank joint is completed by a link which is articulately connected on the one side to the rear gear and on the other to the rear end of the upper blade and thus produces a longitudinal stroke which is equal to twice the amount of the space in between the axis of rotation of the gear and articulation axis of the link, and the latter may be accommodated compactly between the gear and the upper blade.

By providing a plurality of insertion holes in the rear gear and/or displacement of the eccentric pin different relative movements may be obtained selectively between the blades and may be adapted conveniently to the particular material to be cut.

The movement which a point of the upper blade executes relatively to a fixed point is characterised by a Lissajous figure with a frequency ratio of 1:2 and a phase difference of magnitude 0. Such a characteristic of the relative movement was not present in hitherto known comparable means.

An example of the invention will be explained hereinafter with the aid of the drawings, wherein:

FIGS. 3-5 show views corresponding to FIG. 2 with different relative positions of the blades.

Figure 1:
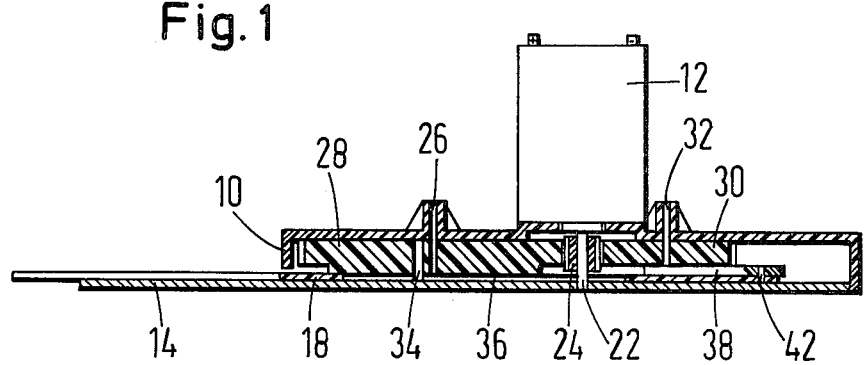
FIG. 1 is a vertical section through the drive and transmission arrangement of motor-driven grass shears constructed according to the invention without the housing structure and batteries.

The base plate 10 of the shears housing, not illustrated in the drawings, carries an electric motor 12 to which power can be applied via a battery, not illustrated, and a corresponding safety switch. Connected to the housing plate 10 is the fixed lower blade 14 which according to the example of embodiment illustrated has a blade comb comprising three blades 16. On this lower blade 14 the moving upper blade 18 slides and in the example of embodiment is provided with a blade comb consisting of two blades 20 which in the central position lie between the teeth 16 of the stationary blade.

The vertical output shaft 22 of the motor 12, which is mounted in a bore of the fixed blade 14, carries a drive pinion 24 having a relatively smaller amount of teeth. Meshing with this drive pinion 24 is a gear 28 mounted rotatably about an axis 26 fixed with respect to the housing in the front part of the shears; also meshing with the pinion is a gear 30 in the rear part of the shears rotatable about an axis 32. The axes 32 and 26 lie together with the axes of the output shaft 22 on the longitudinal centre line of the shears.

The front gear 28 carries an eccentric pin 34 which projects into a slot 36 of the upper blade.

Between the gear 30 and the upper blade 18 there is a link 38 which is articulately connected via a pin 40 to the gear 30 and via a pin 42 to the rear end of the upper blade in the centre line thereof. The eccentric drive 34 sets the upper blade in lateral motion whilst the longitudinal motion is produced by the crank joint 30, 38. The movement cycle is seen in FIGS. 2 to 5. In the position according to FIG. 3 the stroke is carried out to the maximum extent forwardly in the longitudinal direction, the blades 20 being offset to one side, and with the blades 16 leaving an entrance free for the grass.

Figure 2:
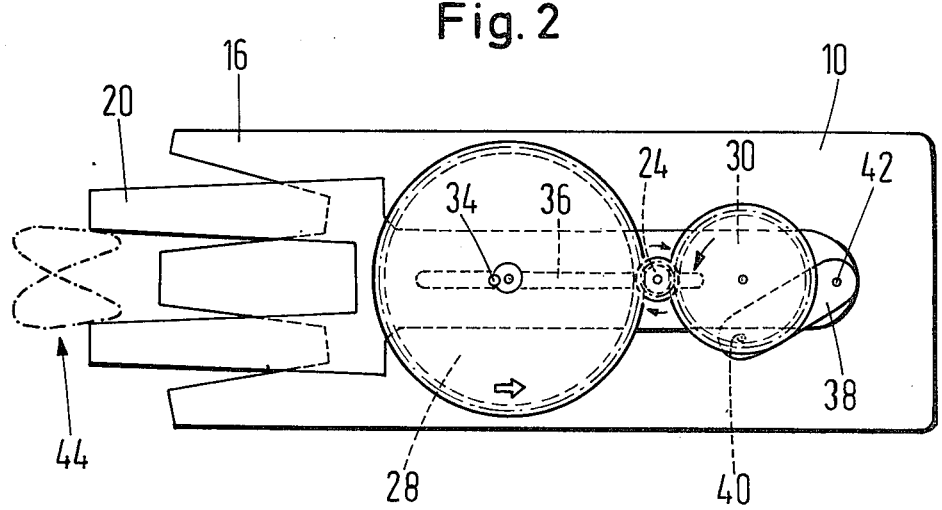
FIG. 2 is a plan view of the transmission arrangement and the blades of the arrangement illustrated in FIG. 1.

FIG. 2 shows a position in which the gear 30 is pivoted through 90° in the direction of the arrow, the gear 28 being pivoted through about 45° so that the blades lie substantially symmetrically on each other, which is the actual beginning of the cutting operation. In the position according to FIG. 4 the upper blade has reached its lowermost position, the gear 30 being pivoted with respect to the starting position through 180° and the drive gear 28 through about 90°. This represents the end of the cutting operation.

In the position according to FIG. 5 which is substantially symmetrical to the position according to FIG. 3, the gear 30 is rotated through 270° and the eccentric gear substantially through half this angle. A new cutting operation can now be initiated and the operation is repeated in rapid succession.

FIG. 2 shows the curve through which a point of the moving blade passes for one complete revolution of the gear 30. This curve 44 has the form of a Lissajous Figure.

It is convenient to obtain the optimum curve form by corresponding dimensioning of the members of the transmission gearing in the factory; however, it is alternatively possible to change one or more of the transmission members as regards their effective length or articulation points and provide the possibility of the user making an adjustment; on the corresponding transmission parts or on use directions it should be indicated which transmission dimensions are best suitable to which purposes.

I claim:

1. A grass shears comprising:
   a relatively fixed lower blade;
   an upper blade which is relatively movable with respect to said lower blade;
   a drive motor; a drive shaft extending from said motor and connected with said upper blade; a pinion connected to said drive shaft for being rotated thereby;
   a first oscillatory motion causing gear which is relatively fixedly located with respect to said lower blade and which engages and is rotatable along with said pinion; an eccentric element on said first gear and connected to said upper blade such that rotation of said first gear imparts a lateral shearing movement to said upper blade with respect to said lower blade;
   a second longitudinal motion causing gear which is relatively fixedly located with respect to said lower blade and which engages and is rotatable along with said pinion; a crank joined to said second gear, on the one hand, and to said upper blade, on the other hand, such that rotation of said second gear imparts a longitudinal movement to said upper blade with respect to said lower blade.

2. The grass shears of claim 1, wherein said first and said second gears lie in the cutting plane of said blades.

3. The grass shears of claim 2, wherein said first and said second gears and said pinion all have respective first, second and pinion axes; said axes all lying along a common center line along the longitudinal center line of said shears.

4. The grass shears of claim 3, wherein said upper and said lower blades include cutting means at one longitudinal side of said pinion, with said first gear being on the side of said pinion nearer to said cutting means.

5. The grass shears of claim 2, wherein said pinion is a gear having fewer teeth around its entire circumference than either of said first and said second gears, for accomplishing speed reduction between said pinion and said first and said second gears.

6. The grass shears of claim 5, wherein said second gear is sized to rotate at approximately twice the speed of said first gear.

7. The grass shears of claim 4, wherein said pinion is a gear having fewer teeth around its entire circumference than either of said first and said second gears, for accomplishing speed reduction between said pinion and said first and said second gears.

8. The grass shears of claim 7, wherein said second gear is sized to rotate at approximately twice the speed of said first gear.

9. The grass shears of claim 3, wherein said upper blade has a longitudinally extending slot extending along it and said first gear eccentric element being received in said slot and moving relatively with respect to said upper blade along said slot.

10. The grass shears of claim 4, wherein said upper blade has a longitudinally extending slot extending along it and said first gear eccentric element being received in said slot and moving relatively with respect to said upper blade along said slot.

11. The grass shears of claim 1, wherein said crank comprises a crank link which is articulatedly connected eccentrically to said second gear and is articulatedly connected to said upper blade.

12. The grass shears of claim 11, wherein said second gear overlies said upper blade, and said crank link slides between said second gear and said upper blade.

13. The grass shears of claim 11, wherein said first and said second gears lie in the cutting plane of said blades.

14. The grass shears of claim 13, wherein said first and said second gears and said pinion all have respective first, second and pinion axes; said axes all lying along a common center line along the longitudinal center line of said shears;

said upper and said lower blades including cutting means at one longitudinal side of said pinion, with said first gear being on the side of said pinion nearer to said cutting means.

15. The grass shears of claim 14, wherein said upper blade has a longitudinally extending slot extending along it and said first gear eccentric element being received in said slot and moving relatively with respect to said upper blade along said slot.

* * * * *